(12) United States Patent
Wieland (10) Patent No.: US 10,626,040 B2
(45) Date of Patent: Apr. 21, 2020

(54) ARTICLES CAPABLE OF INDIVIDUAL SINGULATION

(71) Applicant: Corning Incorporated, Corning, NY (US)

(72) Inventor: Kristopher Allen Wieland, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 51 days.

(21) Appl. No.: 16/007,015

(22) Filed: Jun. 13, 2018

(65) Prior Publication Data

US 2018/0362387 A1    Dec. 20, 2018

Related U.S. Application Data

(60) Provisional application No. 62/520,069, filed on Jun. 15, 2017.

(51) Int. Cl.
| | |
|---|---|
| *C03B 33/023* | (2006.01) |
| *C03C 21/00* | (2006.01) |
| *C03B 33/02* | (2006.01) |
| *C03C 15/00* | (2006.01) |
| *C03C 23/00* | (2006.01) |

(52) U.S. Cl.
CPC ........ *C03B 33/023* (2013.01); *C03B 33/0222* (2013.01); *C03C 15/00* (2013.01); *C03C 21/002* (2013.01); *C03C 23/0025* (2013.01)

(58) Field of Classification Search
CPC . C03B 33/0222; C03B 33/023; C03C 21/002; C03C 23/0025; C03C 15/00

USPC ........................................ 216/24, 65, 97, 98
See application file for complete search history.

(56) References Cited

U.S. PATENT DOCUMENTS

| | | | |
|---|---|---|---|
| 1,790,397 | A | 1/1931 | Woods et al. |
| 2,682,134 | A | 6/1954 | Stookey |
| 2,749,794 | A | 6/1956 | O'Leary |
| 3,647,410 | A | 3/1972 | Heaton et al. |
| 3,695,497 | A | 10/1972 | Dear |
| 3,695,498 | A | 10/1972 | Dear |

(Continued)

FOREIGN PATENT DOCUMENTS

| | | |
|---|---|---|
| CN | 2388062 Y | 7/2000 |
| CN | 1283409 C | 11/2006 |

(Continued)

OTHER PUBLICATIONS

Mbise et al. "Angular selective window coatings: theory and experiments" J. Phys. D: Appl. Phys. 30 2103 (1997).

(Continued)

*Primary Examiner* — Binh X Tran
(74) *Attorney, Agent, or Firm* — Smit Kapadia; Svetlana Z. Short (57) ABSTRACT

A method of forming a glass article includes steps of: providing a glass substrate sheet, forming a first array of first damage regions, forming a second array of second damage regions which define a plurality of portions, wherein the second array of second damage regions define one or more interrupted zones. The interrupted zones may have a largest dimension of about 10 microns or greater. The method further includes steps of etching the glass substrate and singulating the plurality of portions from the glass substrate sheet.

13 Claims, 6 Drawing Sheets

(56) References Cited

U.S. PATENT DOCUMENTS

| | | | |
|---|---|---|---|
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinnelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett, Jr. |
| 5,400,350 A | 3/1995 | Gavanauskas |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka |
| 5,586,138 A | 12/1996 | Yokoyama |
| 5,622,540 A | 4/1997 | Stevens |
| 5,656,186 A | 8/1997 | Mourou et al. |
| 5,676,866 A | 10/1997 | In Den Baumen et al. |
| 5,684,642 A | 11/1997 | Zumoto et al. |
| 5,696,782 A | 12/1997 | Harter et al. |
| 5,736,709 A | 4/1998 | Neiheisel |
| 5,776,220 A | 7/1998 | Allaire et al. |
| 6,016,223 A | 1/2000 | Suzuki et al. |
| 6,033,583 A | 3/2000 | Musket et al. |
| 6,038,055 A | 3/2000 | Hansch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,744,009 B1 | 6/2004 | Xuan et al. |
| 6,787,732 B1 | 9/2004 | Xuan et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,061,583 B2 | 6/2006 | Mulkens et al. |
| 7,353,829 B1 | 4/2008 | Wachter et al. |
| 7,402,773 B2 | 7/2008 | Nomaru |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,750,342 B1 * | 6/2014 | Raring .......... H01L 33/005 372/44.01 |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Pluss |
| 8,943,855 B2 | 2/2015 | Gomez et al. |
| 8,951,889 B2 | 2/2015 | Ryu et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh et al. |
| 9,517,929 B2 | 12/2016 | Hosseini |
| 9,815,730 B2 | 11/2017 | Marjanovic et al. |
| 9,850,160 B2 | 12/2017 | Marjanovic et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2001/0110639 | 8/2002 | Bruns |
| 2003/0006221 A1 | 1/2003 | Hong et al. |
| 2003/0007773 A1 | 1/2003 | Kondo et al. |
| 2004/0221615 A1 | 11/2004 | Postupack et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2005/0277270 A1 | 12/2005 | Yoshikawa et al. |
| 2006/0011593 A1 | 1/2006 | Fukuyo et al. |
| 2006/0028728 A1 | 2/2006 | Li |
| 2006/0109874 A1 | 5/2006 | Shiozaki et al. |
| 2006/0127679 A1 | 6/2006 | Gulati et al. |
| 2006/0151450 A1 | 7/2006 | You et al. |
| 2006/0227440 A1 | 10/2006 | Gluckstad |
| 2006/0266744 A1 | 11/2006 | Nomaru |
| 2006/0289410 A1 | 12/2006 | Morita et al. |
| 2007/0051706 A1 | 3/2007 | Bovatsek et al. |
| 2007/0091977 A1 | 4/2007 | Sohn et al. |
| 2007/0111390 A1 | 5/2007 | Komura et al. |
| 2007/0111480 A1 | 5/2007 | Maruyama et al. |
| 2007/0119831 A1 | 5/2007 | Kandt |

(56) References Cited

U.S. PATENT DOCUMENTS

| | | |
|---|---|---|
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0079940 A1 | 4/2008 | Sezerman et al. |
| 2008/0099444 A1 | 5/2008 | Misawa et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0025387 A1 | 2/2010 | Arai et al. |
| 2010/0029460 A1 | 2/2010 | Shouiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0320179 A1 | 12/2010 | Morita et al. |
| 2010/0326138 A1 | 12/2010 | Kumatani et al. |
| 2011/0049764 A1 | 3/2011 | Lee et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0139760 A1 | 6/2011 | Shah et al. |
| 2011/0183116 A1 | 7/2011 | Hung et al. |
| 2011/0210105 A1 | 9/2011 | Romashko et al. |
| 2011/0240611 A1 | 10/2011 | Sandstrom |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0091897 A1 | 4/2013 | Fujii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0209731 A1 | 8/2013 | Nattermann et al. |
| 2013/0216573 A1 | 8/2013 | Trusheim et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0147650 A1* | 5/2014 | Jiang .................. H01L 21/0237 428/220 |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Wiegel et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | Desimone et al. |
| 2015/0034612 A1 | 2/2015 | Hosseini et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0151380 A1 | 6/2015 | Hosseini |
| 2015/0158120 A1 | 6/2015 | Courvoisier et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0207023 A1* | 7/2015 | Nielson .............. H01L 31/1804 438/68 |
| 2015/0232369 A1 | 8/2015 | Marjanovic et al. |
| 2015/0299018 A1 | 10/2015 | Bhuyan et al. |
| 2015/0367442 A1 | 12/2015 | Bovatsek et al. |
| 2016/0008927 A1 | 1/2016 | Grundmueller et al. |
| 2016/0009066 A1* | 1/2016 | Nieber .................. B23K 26/53 156/272.8 |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0117288 A1 | 4/2016 | Sills et al. |
| 2016/0152516 A1* | 6/2016 | Bazemore ............ C03C 3/083 65/30.14 |
| 2016/0199944 A1* | 7/2016 | Hosseini ............. B23K 26/364 428/131 |
| 2016/0279895 A1 | 9/2016 | Marjanovic et al. |
| 2016/0280580 A1 | 9/2016 | Bohme |
| 2016/0290791 A1 | 10/2016 | Buono et al. |

(56) References Cited

U.S. PATENT DOCUMENTS

| | | | |
|---|---|---|---|
| 2016/0368100 A1 | 12/2016 | Marjanovic et al. | |
| 2017/0002601 A1 | 1/2017 | Bergh et al. | |
| 2017/0169847 A1 | 6/2017 | Tamaki | |
| 2018/0249579 A1* | 8/2018 | Garner | C03B 33/0222 |
| 2019/0341320 A1* | 11/2019 | Pollard | H01L 21/6835 |

FOREIGN PATENT DOCUMENTS

| | | |
|---|---|---|
| CN | 101386466 A | 3/2009 |
| CN | 101502914 A | 8/2009 |
| CN | 201357287 Y | 12/2009 |
| CN | 101637849 A | 2/2010 |
| CN | 201471092 U | 5/2010 |
| CN | 102060437 A | 5/2011 |
| CN | 102248302 A | 11/2011 |
| CN | 102343631 A | 2/2012 |
| CN | 102649199 A | 8/2012 |
| CN | 102672355 A | 9/2012 |
| CN | 102898014 A | 1/2013 |
| CN | 102916081 A | 2/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| DE | 2231330 A1 | 1/1974 |
| DE | 102006035555 A1 | 1/2008 |
| DE | 102012010635 A1 | 11/2013 |
| DE | 102013223637 A1 | 5/2015 |
| EP | 0270897 A1 | 6/1988 |
| EP | 0609978 A1 | 8/1994 |
| EP | 1159104 B1 | 8/2004 |
| EP | 2202545 A1 | 6/2010 |
| EP | 2783784 A2 | 10/2014 |
| FR | 2989294 A1 | 10/2013 |
| GB | 1242172 A | 8/1971 |
| JP | 1989179770 A | 7/1989 |
| JP | 1994318756 A | 11/1994 |
| JP | 1997106243 A | 4/1997 |
| JP | 1999269683 A | 10/1999 |
| JP | 1999347758 A | 12/1999 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003062756 A | 3/2003 |
| JP | 2003114400 A | 4/2003 |
| JP | 2003154517 A | 5/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 2006130691 A | 5/2006 |
| JP | 2006248885 A | 9/2006 |
| JP | 2007021548 A | 2/2007 |
| JP | 2007253203 A | 10/2007 |
| JP | 2009172633 A | 8/2009 |
| JP | 2010017990 A | 1/2010 |
| JP | 2010046761 A | 3/2010 |
| JP | 4592855 B2 | 12/2010 |
| JP | 2011049398 A | 3/2011 |
| JP | 4672689 B2 | 4/2011 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 05274085 B2 | 8/2013 |
| JP | 05300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2009057161 A | 6/2009 |
| KR | 1020621 B1 | 3/2011 |
| KR | 2012015366 A | 2/2012 |
| KR | 2012074508 A | 7/2012 |
| KR | 2013031380 A | 3/2013 |
| KR | 1269474 B1 | 5/2013 |
| KR | 2013124646 A | 11/2013 |
| KR | 1344368 B1 | 12/2013 |
| KR | 2014022980 A | 2/2014 |
| KR | 2014022981 A | 2/2014 |
| KR | 1020140064220 A | 5/2014 |
| TW | 201139025 A | 11/2011 |
| TW | 201226345 A | 7/2012 |
| WO | 1999029243 A1 | 6/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | 2008049389 A1 | 5/2008 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2011056781 A1 | 5/2011 |
| WO | 2012006736 A2 | 1/2012 |
| WO | 2012166753 A2 | 6/2012 |
| WO | 2012108052 A1 | 8/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014064492 A1 | 5/2014 |
| WO | 2014079478 A1 | 5/2014 |
| WO | 2014079570 A1 | 5/2014 |
| WO | 2015127583 A1 | 9/2015 |
| WO | 2016005455 A1 | 1/2016 |
| WO | 2016010954 A2 | 1/2016 |
| WO | 2016154284 A1 | 9/2016 |

OTHER PUBLICATIONS

McGloin et al."Bessel beams: diffraction in a new light" Contemporary Physics, vol. 46 No. 1 (2005) pp. 15-28.

Merola et al. "Characterization of Bessel beams generated by polymeric microaxicons" Meas. Sci. Technol. 23 (2012) 10 pgs.

Mirkhalaf, M. et al., Overcoming the brittleness of glass through bio-inspiration and micro-achitecture, Nature Communications, 5:3166/ncomm4166(2014).

Perry et al., "Ultrashort-pulse laser machining of dielectric materials"; Journal of Applied Physics, vol. 85, No. 9, May 1, 1999, American Institute of Physics, pp. 6803-6810.

Perry et al., "Ultrashort-pulse laser machining"; UCRL-ID-132159, Sep. 1998, pp. 1-38.

Perry et al., "Ultrashort-pulse laser machining"; UCRL-JC-132159 Rev 1., Jan. 22, 1999, pp. 1-24.

Polynkin et al., "Extended filamentation with temporally chirped femtosecond Bessel-Gauss beams in air"; Optics Express, vol. 17, No. 2, Jan. 19, 2009, OSA, pp. 575-584.

Romero et al. "Theory of optimal beam splitting by phase gratings. II. Square and hexagonal gratings" J. Opt. Soc. Am. A/vol. 24 No. 8 (2007) pp. 2296-2312.

Salleo A et al., Machining of transparent materials using IR and UV nanosecond laser pulses, Appl. Physics A 71, 601-608, 2000.

Serafetinides et al., "Polymer ablation by ultra-short pulsed lasers" Proceedings of SPIE vol. 3885 (2000) http://proceedings.spiedigitallibrary.org/.

(56) References Cited

OTHER PUBLICATIONS

Serafetinides et al., "Ultra-short pulsed laser ablation of polymers"; Applied Surface Science 180 (2001) 42-56.
Shah et al. "Micromachining with a high repetition rate femtosecond fiber laser", Journal of Laser Micro/Nanoengineering vol. 3 No. 3 (2008) pp. 157-162.
Shealy et al. "Geometric optics-based design of laser beam shapers",Opt. Eng. 42(11), 3123-3138 (2003). doi:10.1117/1.1617311.
Stoian et al. "Spatial and temporal laser pulse design for material processing on ultrafast scales" Applied Physics A (2014) 114, p. 119-127.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Thiele, "Relation between catalytic activity and size of particle" Industrial and Egineering Chemistry, vol. 31 No. 7, pp. 916-920.
Toytman et al. "Optical breakdown in transparent media with adjustable axial length and location", Optics Express vol. 18 No. 24, 24688-24698 (2010).
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Velpula et al.. "Ultrafast imaging of free carriers: controlled excitation with chirped ultrafast laser Bessel beams", Proc. Of SPIE vol. 8967 896711-1 (2014).
Wang et al, "Investigation on CO2 laser irradiation inducing glass strip peeling for microchannel formation", Biomicrofluidics 6, 012820 (2012).
Wu et al. "Optimal orientation of the cutting head for enhancing smoothness movement in three-dimensional laser cutting" (2013) Zhongguo Jiguang/Chinese Journal of Lasers, 40 (1), art. No. 0103005.
Xu et al. "Optimization of 3D laser cutting head orientation based on the minimum energy consumption" (2014) International Journal of Advanced Manufacturing Technology, 74 (9-12), pp. 1283-1291.
Yan et al. "Fiber structure to convert a Gaussian beam to higher-order optical orbital angular momentum modes" Optics Letters vol. 37 No. 16 (2012) pp. 3294-3296.
Yoshino et al., "Micromachining with a high repetition rate femtosecond fiber laser"; JLMN-Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
Kerr. "Filamentary tracks formed in transparent optical glass by laser beam self-focusing. II. Theoretical Analysis" Physical Review A. 4(3) 1971, pp. 1196-1218.
"What is the difference between Ra and RMS?"; Harrison Electropolishing LP; (http://www.harrisonep.com/electropolishingra.html), Accessed Aug. 8, 2016.
"EagleEtch" Product Brochure, EuropeTec USA Inc., pp. 1-8, Aug. 1, 2014.
"PHAROS High-power femtosecond laser system" product brochure; Light Conversion, Vilnius, LT; Apr. 18, 2011, pp. 1-2.
"TruMicro 5000" Product Manual, Trumpf Laser GmbH + Co. KG, pp. 1-4, Aug. 2011.
Abakians et al."Evaporative Cutting of a Semitransparent Body With a Moving CW Laser", J. Heat Transfer 110(4a), 924-930 (Nov. 1, 1988) (7 pages) doi:10.1115/1.3250594.
"Abramov et al., ""Laser separation of chemically strengthened glass"""; Physics Procedia 5 (2010) 285-290, Elsevier.;doi: 10.1016/j.phpro.2010.08.054".

Ahmed et al. "Display glass cutting by femtosecond laser induced single shot periodic void array" Applied Physics A: Materials Science and Proccessing vol. 93 No. 1 (2008) pp. 189-192.
Arimoto et al., "Imaging properties of axicon in a scanning optical system"; Applied Optics, Nov. 1, 1992, vol. 31, No. 31, pp. 6653-6657.
Bagchi et al. "Fast ion beams from intense, femtosecond laser irradiated nanostructured surfaces" Applied Physics B 88 (2007) p. 167-173.
Bhuyan et al. "Laser micro- and nanostructuring using femtosecond Bessel beams", Eur. Phys. J. Special Topics 199 (2011) p. 101-110.
Bhuyan et al. "Single shot high aspect ratio bulk nanostructuring of fused silica using chirp-controlled ultrafast laser Bessel beams" Applied Physics Letters 104 (2014) 021107.
Bhuyan et al. "Ultrafast Bessel beams for high aspect ratio taper free micromachining of glass" Proc. Of SPIE vol. 7728 77281V-1.
Bhuyan et al., "Femtosecond non-diffracting Bessel beams and controlled nanoscale ablation" by IEEE (2011).
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Case Design Guidelines for Apple Devices Release R5 (https://web.archive.org/web/20131006050442/https://developer.apple.com/resources/cases/Case-Design-Guidelines.pdf ; archived on Oct. 6, 2013).
Chiao et al. 9. "Self-trapping of optical beams," Phys. Rev. Lett, vol. 13, No. 15, p. 479 (1964).
Corning Inc., "Corning® 1737 AM LCD Glass Substrates Material Information", issued Aug. 2002.
Corning Inc., "Corning® Eagle2000 TM AMLCD Glass Substrates Material Information", issued Apr. 2005.
Couairon et al. "Femtosecond filamentation in transparent media" Physics Reports 441 (2007) pp. 47-189.
Courvoisier et al. "Applications of femtosecond Bessel beams to laser ablation" Applied Physics A (2013) 112, p. 29-34.
Courvoisier et al. "Surface nanoprocessing with non-diffracting femtosecond Bessel beams" Optics Letters vol. 34 No. 20, (2009) p. 3163-3165.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
Dong et al. "On-axis irradiance distribution of axicons illuminated by spherical wave", Optics & Laser Technology 39 (2007) 1258-1261.
Duocastella et al. "Bessel and annular beams for material processing", Laser Photonics Rev. 6, 607-621, 2012.
Durnin. "Exact solutions for nondiffracting beams I. The scaler theory" J. Opt. Soc. Am. A. 4(4) pp. 651-654.
Eaton et al. "Heat accumulation effects in femtosecond laser written waveguides with variable repetition rates", Opt. Exp. 5280, vol. 14, No. 23, Jun. 2006.
Gattass et al. "Micromachining of bulk glass with bursts of femtosecond laser pulses at variable repetition rates" Opt. Exp. 5280, vol. 14, No. 23, Jun. 2006.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.

(56) References Cited

OTHER PUBLICATIONS

Golub, I., "Fresnel axicon"; Optic Letters, vol. 31, No. 12, Jun. 15, 2006, Optical Society of America, pp. 1890-1892.
Gori et al. "Analytical derivation of the optimum triplicator" Optics Communications 157 (1998) pp. 13-16.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Honda et al. "A Novel Polymer Film that Controls Light Transmission", Progress in Pacific Polymer Science 3, 159-169 (1994).
http://www.gtat.com/Collateral/Documents/English-US/Sapphire/12-21-12_GT_TouchScreen_V3_web.pdf.
Hu et al. "5-axis laser cutting interference detection and correction based on STL model" (2009) Zhongguo Jiguang/Chinese Journal of Lasers, 36 (12), pp. 3313-3317.
Huang et al., "Laser etching of glass substrates by 1064 nm laser irradiation", Applied Physics, Oct. 2008, vol. 93, Issue 1, pp. 159-162.
Juodkazis S. et al. Laser induced microexplosion confined in the bulk of a sapphire crystal: evidence of multimegabar pressures., Phys. Rev. Lett. 96, 166101, 2006.
Karlsson et al. "The technology of chemical glass strengthening—a review" Glass Technol: Eur. J. Glass Sci. Technol. A (2010) 51 (2) pp. 41-54.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Kruger et al., "Femtosecond-pulse visible laser processing of transparent materials"; Applied Surface Science 96-98 (1996) 430-438.
Kruger et al., "Laser micromachining of barium aluminium borosilicate glass with pluse durations between 20 fs and 3 ps"; Applied Surface Science 127-129 (1998) 892-898.
Kruger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.
Levy et al. "Design, fabrication, and characterization of circular Dammann gratings based on grayscale lithography," Opt. Lett vol. 35, No. 6, p. 880-882 (2010).
Liu X et al. "laser ablation and micromachining with ultrashort laser pulses", IEEE J. Quantum Electronics, 22, 1706-1716, 1997.
Maeda et al. "Optical performance of angle-dependent light-control glass", Proc. SPIE 1536, Optical Materials Technology for Energy Efficiency and Solar Energy Conversion X, 138 (Dec. 1, 1991).

\* cited by examiner

ARTICLES CAPABLE OF INDIVIDUAL SINGULATION

This application claims the benefit of priority under 35 U.S.C. § 119 of U.S. Provisional Application Ser. No. 62/520,069, filed on Jun. 15, 2017, the content of which is relied upon and incorporated herein by reference in its entirety.

FIELD OF THE DISCLOSURE

The disclosure relates to articles with damage regions, and more particularly to articles having a plurality of damage region arrays.

BACKGROUND

Glass-based articles can be made in large sheets. Large sheets may be advantageous for use in large applications (e.g., displays), but often desired piece parts are smaller in size than what the sheets that they are manufactured in. Conventional work arounds include processing large sheets with one of the last steps implemented being to take the large (mother) sheet and separate out all the individual parts. In other words, in the individual parts are manufactured in a serial manner rather than in parallel.

Often, the separation of the individual parts is accomplished through mechanical dicing. However, mechanical dicing may have several disadvantages including: a highly serial nature which may be slow, a speed dependency which is a function of thickness of substrate, multiple passes, restrictions on dicing geometry, weakened dicing edges and/or low yield.

Further, glass parts may have features which are created via an etch step. Etching may provide for the creation of features in the part such as holes or slots, cleaning the part, enhancing strength, or creating a surface texture, but may interfere or be hampered by dicing.

SUMMARY OF THE DISCLOSURE

According to one aspect of the present disclosure, a method of forming a glass article includes steps of: providing a glass substrate sheet, forming a first array of first damage regions, forming a second array of second damage regions which define a plurality of portions, wherein the second array of second damage regions define one or more interrupted zones. The interrupted zones may have a largest dimension of about 10 microns or greater. The method further includes steps of etching the glass substrate and singulating the plurality of portions from the glass substrate sheet.

According to another aspect of the present disclosure, a method of forming a glass article includes steps of: providing a glass substrate sheet, forming a first array of first damage regions to form a plurality of first portions, forming a second array of second damage regions to form a plurality of second portions, wherein the second array of damage regions define one or more interrupted zones, etching the glass substrate sheet such that the first portions are disconnected from the glass substrate sheet and singulating the plurality of second portions from the glass substrate sheet.

According to yet another aspect of the present disclosure, an article includes a substrate sheet. A first array of first damage regions define a plurality of holes defined though the substrate sheet. A second array of second damage regions defines a plurality of second portions. The second array of damage regions defines one or more interrupted zones including a length of about 10 microns or greater.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
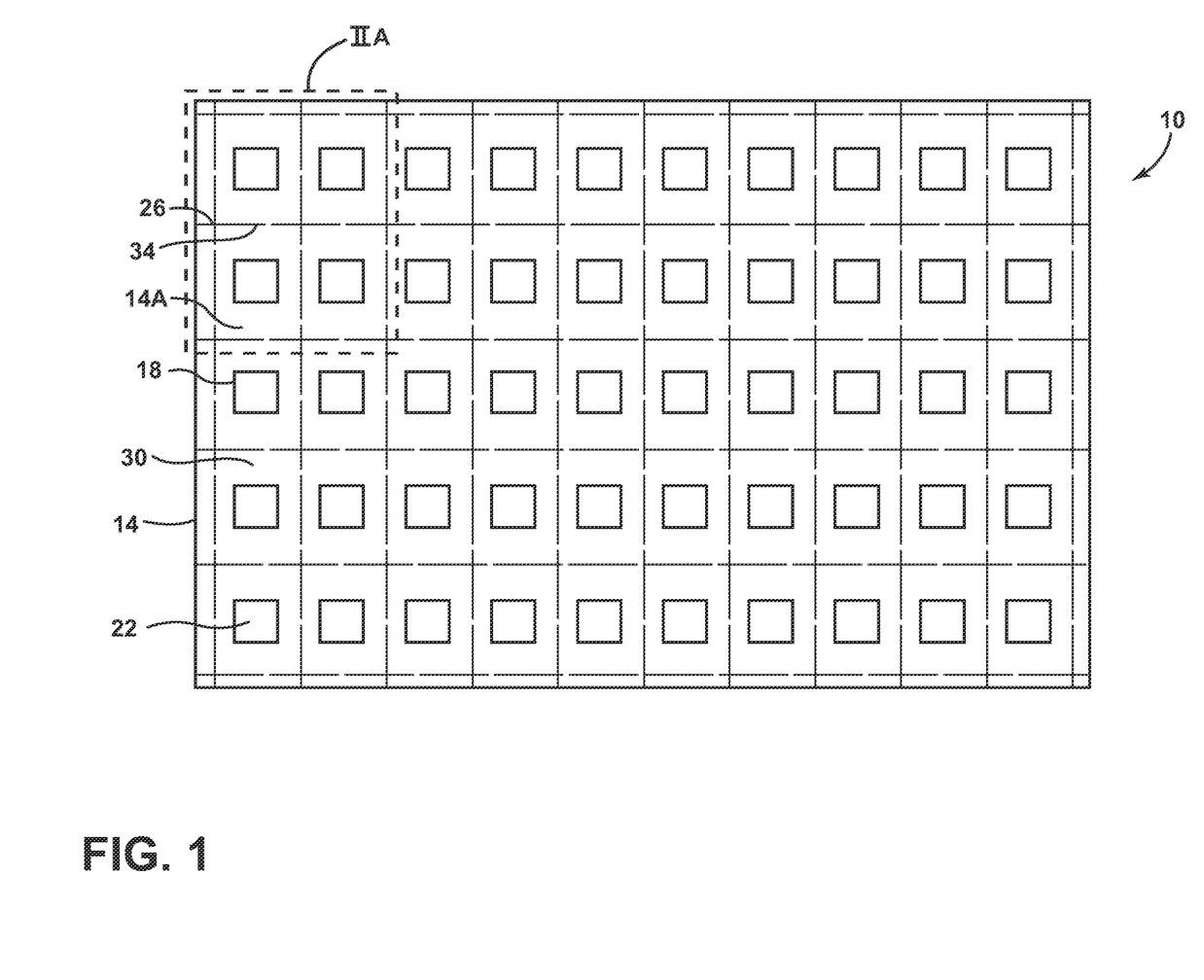
FIG. 1 is a plan view of an article, according to at least one example.
Figure 2A:
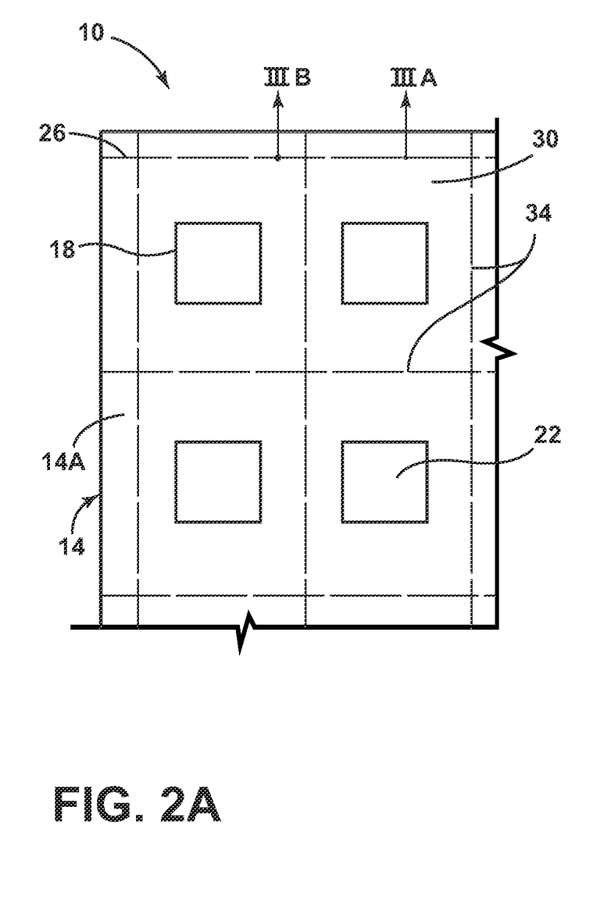
FIG. 2A is an enhanced view of the article of FIG. 1 taken at section IIA, according to at least one example.
Figure 2B:
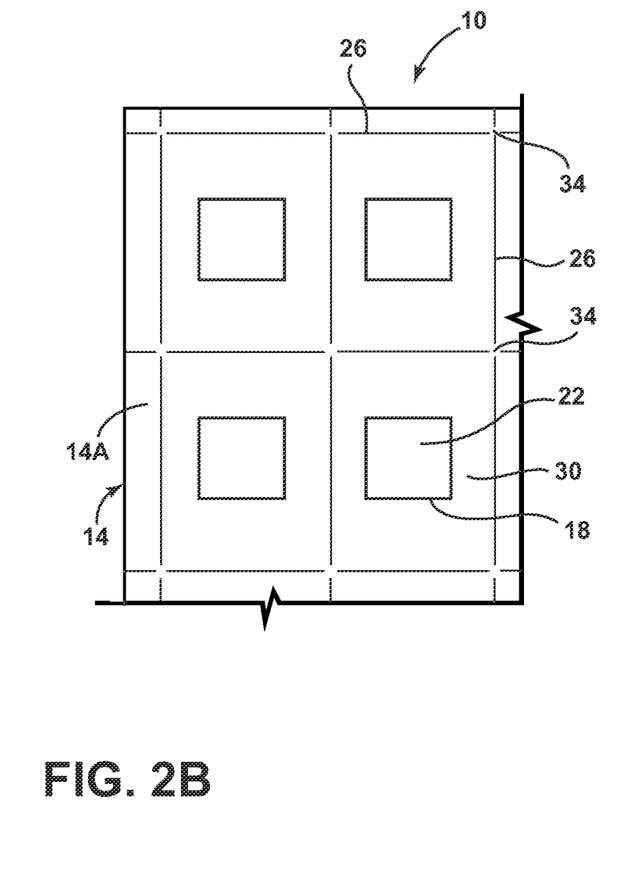
FIG. 2B is an enhanced view of the article of FIG. 1 taken at section IIA, according to at least one example.

Referring now to FIG. 1, a glass article 10 includes a substrate sheet 14. The substrate sheet 14 has a first array of first damage regions 18 which defines a plurality of first portions 22. A second array of second damage regions 26 define a plurality of second portions 30. The first and second arrays of damage regions 18, 26 are defined in the substrate sheet 14. The second array of damage regions 26 define one or more interrupted zones 34.

Figure 3A:
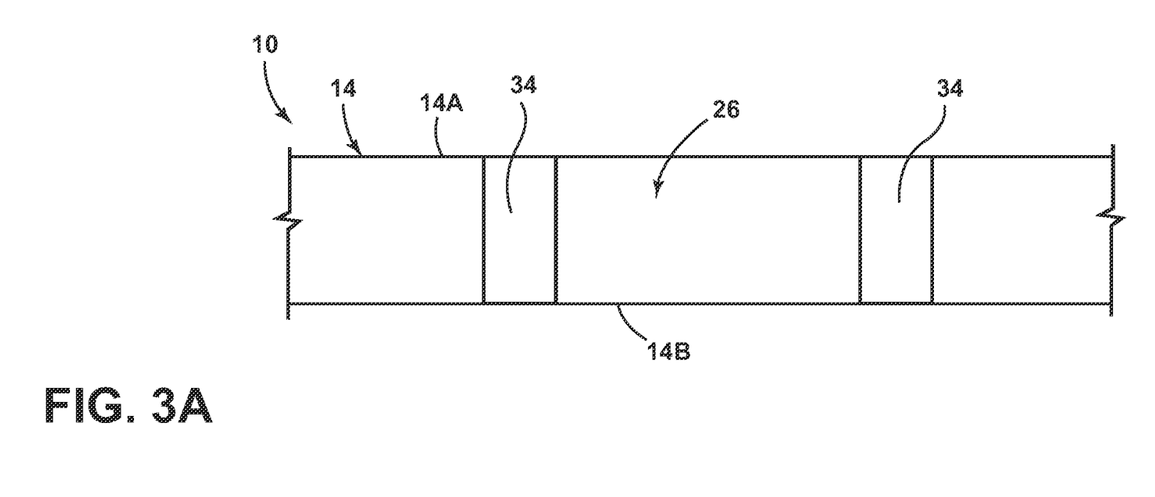
FIG. 3A is a cross-sectional view of taken along line IIIA of FIG. 2A, according to at least one example.

The substrate sheet 14 may define opposing primary surfaces called a first surface 14A and a second surface 14B (FIG. 3A). It will be understood that the substrate sheet 14 may further define one or more minor surfaces positioned along edges thereof. The substrate sheet 14 may include a glass, a glass-ceramic, a ceramic material and/or combinations thereof. Exemplary glass-based examples of the substrate sheet 14 may include soda lime glass, alkali aluminosilicate glass, alkali containing borosilicate glass and/or alkali aluminoborosilicate glass. For purposes of this disclosure, the term "glass-based" may mean a glass, a glass-ceramic and/or a ceramic material. According to various examples, the substrate sheet 14 may be a glass-based substrate. In glass-based examples of the substrate sheet 14, the sheet 14 may be strengthened or strong. For instance, glass examples of the substrate sheet 14 may be thermally tempered (e.g., for strong substrate sheets 14) or have an ion exchanged region (e.g., for strengthened substrate sheets 14). Further, the substrate sheet 14 may include sapphire and/or polymeric materials. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

The substrate sheet 14 may be substantially translucent, clear, transparent and/or free from light scattering. For example, the substrate sheet 14 may be optically transparent to light having a wavelength in the range of between about 100 nanometers and about 1,200 nanometers, or in a range of about 250 nanometers to about 1,100 nanometers. In some examples, the transmission of light through the substrate sheet 14 may be dependent on the wavelength of the light. For example, the substrate sheet 14 may be optically opaque or translucent over a visible wavelength band (e.g., from about 400 nm wavelength to about 700 nm wavelength) while substantially or fully transmissive at non-visible wavelengths (e.g., to the laser beam as described later).

According to various examples, the substrate sheet 14 can have a thickness (i.e., as measured from the first surface 14A to the second surface 14B) ranging from about 50 μm to about 5 mm. Exemplary thicknesses of the substrate sheet 14 range from 1 μm to 1000 μm, or 100 μm to 500 μm. For example, the substrate sheet 14 may have a thickness of about 100 μm, 200 μm, 300 μm, 400 μm, 500 μm, 600 μm, 700 μm, 800 μm, 900 μm or 1000 μm. According to other examples, the glass-based substrate sheet 14 may have a thickness greater than or equal to about 1 mm, about 2 mm, about 3 mm, about 4 mm, or about 5 mm. In one or more specific examples, the glass-based substrate sheet 14 may have a thickness of 2 mm or less or less than about 1 mm.

The substrate sheet 14 of the article 10 defines the first surface 14A and the second surface 14B (FIG. 3A). The first and second surfaces 14A, 14B of the substrate sheet 14 may define major opposing surfaces of the substrate sheet 14. In will be understood that the substrate sheet 14 may further define one or more minor surfaces along a perimeter or circumference of the sheet 14. The substrate sheet 14 may be a substantially planar sheet, although other examples may utilize a curved or otherwise shaped or sculpted sheet 14. Additionally or alternatively, the thickness of the substrate sheet 14 may vary along one or more of its dimensions for aesthetic and/or functional reasons. For example, the edges of the substrate sheet 14 may be thicker as compared to more central regions of the substrate sheet 14, or vice versa. The length, width and thickness dimensions of the substrate sheet 14 may also vary according to the application or use of the article 10.

The substrate sheet 14 defines or includes the first array of first damage regions 18 and the second array of second damage regions 26. For purposes of this disclosure, an array may be a series of repeating or non-repeating patterns extending across a portion, a majority, substantially all or all of the substrate sheet 14. The first and second damage regions 18, 26 of the first and second arrays may be in contact with each other, separated, spaced apart and/or combinations thereof. In other words, each of the second damage regions 26 may not need to be touching or in a pattern to form the second array.

The first and/or second damage regions 18, 26 may form straight lines, curves, free-form shapes, geometrical patterns (e.g., triangular, square, hexagonal, tessellations) and/or combinations thereof. The first and/or second damage regions 18, 26 may each form a closed or an open shape. An open shape is made up of line segments, but there is at least one line segment that isn't connected to anything at one of its endpoints. A closed shape may be formed of a plurality of line segments with no openings. As will be explained in greater detail below, the first and/or second damage regions 18, 26 are formed of a plurality of individual, or stand alone, damage channels 38 (FIG. 4) which are separated (e.g., by about 10 µm or less) from one another. As such, although the damage channels 38 are separated from one another, the shape of the first and/or second damage regions 18, 26 may be said to be open if a gap, or opening, exists between ends of the shape that is larger than the interrupted zones 34 as defined herein. The first and second arrays of first and second damage regions 18, 26 may each be structures which extend across a portion, a majority or substantially all of the substrate sheet 14. According to various examples, each of the first and second damage regions 18, 26 may form a repeating pattern to form the arrays, but it will be understood that some or all of the first and/or second damage regions 18, 24 may be different than each other. For example, each of the second damage regions 26 may be different while the first damage regions 18 are the same, or vice versa. In the depicted example, each of the first damage regions 18 are positioned within, or substantially surrounded by, the second damage regions 26. According to yet other examples, the first and second damage regions 18, 26 may partially overlap one another.

The first damage regions 18 may each define one of the first portions 22 such that the first portion 22 takes the shape of the first damage regions 18. For example, the first damage regions 18 may have a closed (i.e., fully bounded) shape and/or an open (i.e., not fully bounded) shape. As explained above, the first and second damage regions 18, 26 may at least partially overlap such that the second damage region 26 may aid in the bounding or defining of the shape of the first portions 22 or vice versa. In other words, the first damage regions 18 may form open shapes, but will be closed by the second damage regions 26. As will be explained in greater detail below, in example where the first and/or second damage regions 18, 26 fully bound the first portions 22, the first portions 22 may be removed from the substrate sheet 14 via etching of the substrate sheet 14.

The second damage regions 26 define the second portions 30. The second damage regions 26 may be in contact with one another or may be separate structures. The second damage regions 26 may partially and/or fully surround the first damage regions 18. The second array of damage regions 26 may be a continuous and/or discontinuous structure extending across the substrate sheet 14. The second portions 30 may be said to define or contain the first portions 22. The second damage regions 26 are configured to form a break, or scribe, line in the substrate sheet 14 along which the second portions 30 may be singulated from the substrate sheet 14. In other words, the glass substrate 14 may be configured to singulate the second portions 30 from the substrate 14 along the second array of second damage regions 26.

Referring now to FIGS. 2A, 2B, 3A and 3B, the second array of second damage regions 26 may define one or more interrupted zones 34. The interrupted zones 34 may be defined as zones of the substrate sheet 14 free of damage along the second damage regions 26. The interrupted zones 34 may be positioned, or defined, along edges of the second portion 30 (e.g., FIG. 2A), at corners of the second portions 30 (e.g., FIG. 2B) and/or combinations thereof. Each of the second damage regions 26 may define one or a plurality of interrupted zones 34.

The interrupted zones 34 may have a length, width or longest dimension of about 10 µm or greater, about 50 µm or greater, about 100 µm or greater, about 150 µm or greater, about 200 µm or greater, about 250 µm or greater, about 300 µm or greater, about 350 µm or greater, about 400 µm or greater, about 450 µm or greater, or about 500 µm or greater. For example, the interrupted zones 34 may have a length, width, or longest dimension of about 5 mm or less, about 3 mm or less, about 2 mm or less, about 1.5 mm or less, about 1 mm or less, about 0.75 mm or less, or about 0.5 mm or less. The interrupted zones 34 may account for about 50% or less, about 40% or less, about 30% or less, about 20% or less, about 10% or less, about 9% or less, about 8% or less, about 7% or less, about 6% or less, about 5% or less, about 4% or less, about 3% or less, about 2% or less, about 1% or less, about 0.5% or less, or about 0.1% or less of a perimeter of the second damage regions 26. As will be explained in greater detail below, use of the interrupted zones 34 allow the second portions 30 to remain in place on the substrate sheet 14 after an etching solution is applied to the substrate sheet 14.

Figure 3B:
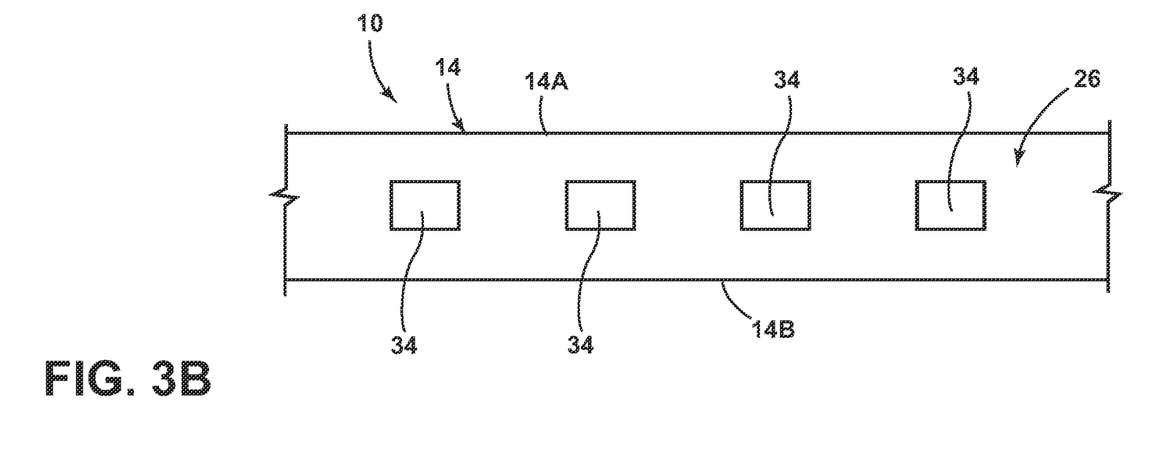
FIG. 3B is a cross-sectional view of taken along line IIIB of FIG. 2A, according to at least one example.

Referring now to FIGS. 3A and 3B the interrupted zones 34 are depicted in a post-etched condition for purposes of clarity. The interrupted zones 34 may be in contact with the first surface 14A and/or the second surface 14B. For example, the interrupted zones 34 may extend between the first and second surfaces 14A, 14B of the substrate sheet 14 (e.g. FIG. 3A), or may be positioned partially or fully between the first and second surfaces 14A, 14B (e.g. FIG. 3B). It will be understood that the interrupted zones 34, prior to etching, may extend to contact both the first and second surfaces 14A, 14B.

Figure 4:
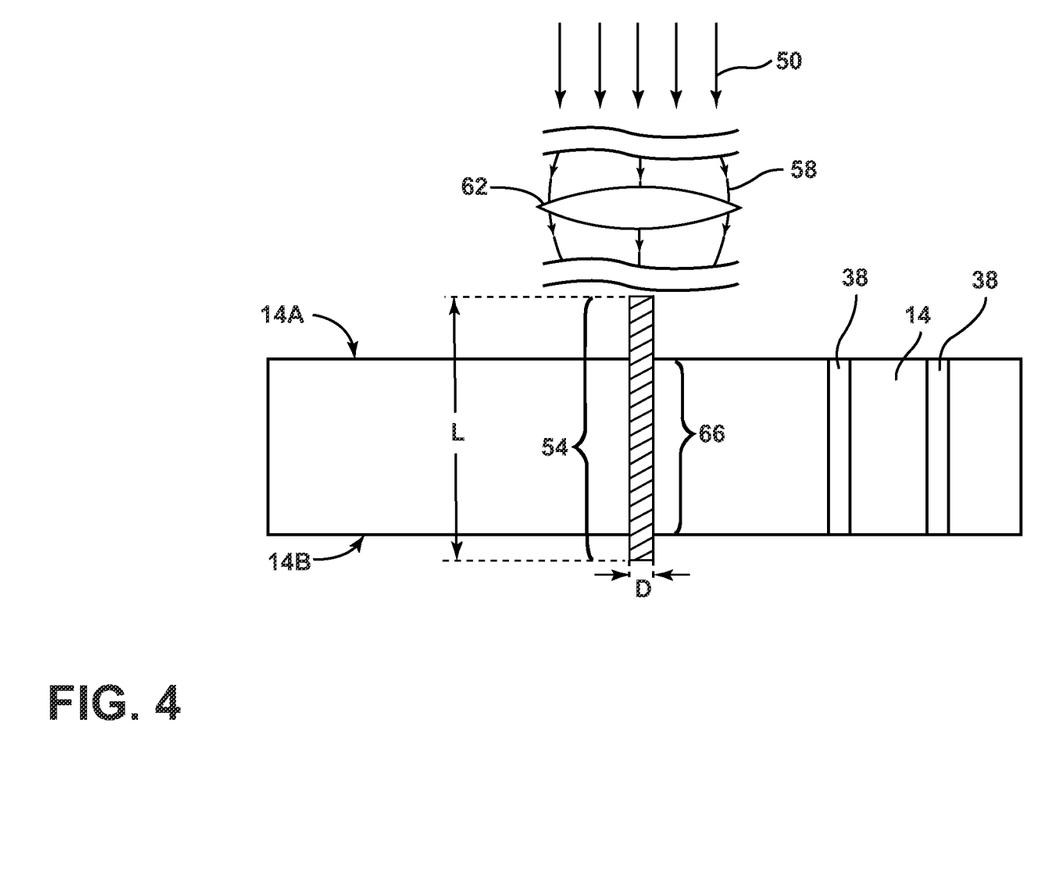
FIG. 4 is a schematic illustration of an optical assembly for forming damage channels and damage regions, according to at least one example.

Referring now to FIG. 4, according to various examples, the first and/or second damage regions 18, 26 (FIG. 1) may be formed from a plurality of damage channels 38. An ultra-short pulsed laser may be used to create the damage channels 38 through the substrate sheet 14 of the article 10. The details of the optical setup that enables the creation of the damage channels 38 are described below, and in U.S. application Ser. No. 14/154,525 filed on Jan. 13, 2014, the entire contents of which are incorporated by reference as if fully set forth herein. For example, in some embodiments, a short-pulsed laser is utilized in conjunction with an axicon lens element in an optical lens assembly to create a region of high aspect ratio damage channels 38 using ultra-short (picoseconds or femtosecond duration) Bessel beams. In other words, in these embodiments the axicon condenses the laser beam into a high intensity region that is generally cylindrical in shape and has a high aspect ratio in the body of the substrate 14. Such a design may be known as a Bessel laser beam, line focus laser beam, or a distributed focus laser beam. In other embodiments, other lens elements are utilized to create non-diffractive or quasi-non-diffractive laser beams focal lines. Due to the high intensity of the condensed laser beam, nonlinear interaction of the electromagnetic field of the laser and the material of the substrate 14 occurs and the laser energy is transferred to the substrate sheet 14 to effect formation of defects that become constituents of the damage channels 38. However, it is important to realize that in the areas of the substrate sheet 14 where the laser energy intensity is not high (e.g., the first surface 14A, volume of the substrate sheet 14 surrounding the central convergence line), the material is transparent to the laser and there is no mechanism for transferring energy from the laser to the material. Within the context of the present disclosure, a material is substantially transparent to the laser wavelength when the absorption is about 50% or less, about 40% or less, about 30% or less, about 20% or less, about 10% or less, or about 1% or per millimeter of material depth at this wavelength. As a result, the substrate sheet 14 may remain unaffected or substantially unaffected in the regions where the laser intensity is below the nonlinear threshold.

Through use of the ultra-short pulsed laser, it is possible to create microscopic damage channels 38 in the optically transparent substrate sheet 14 using one or more high energy pulses or one or more bursts of high energy pulses. The damage channels 38 are regions of the substrate sheet 14 material modified by the laser. The laser-induced modifications disrupt the structure of the substrate sheet 14 material. Structural disruptions include compaction, melting, dislodging of material, rearrangements, and/or bond scission. The damage channels 38 extend into the interior of the substrate sheet 14 and have a cross-sectional shape consistent with the cross-sectional shape of the laser (e.g., generally circular). In examples where the damage channels 38 have a different shape, the damage channels 38 may be formed via multiple pulses while moving, or translating the substrate sheet 14 and/or laser.

In practice, the pulsed laser may be utilized to form the damage channels 38 or damage regions 18, 26 in material of the substrate sheet 14. In an exemplary method of using the laser to form the damage channels 38 or damage regions 18, 26 on or in the substrate sheet 14, the method may proceed by focusing a pulsed laser beam 50 into a laser beam focal line 54, viewed along the beam propagation direction. The laser beam focal line 54 can be created by several ways, for example, Bessel beams, Airy beams, Weber beams and Mathieu beams (i.e., non-diffractive beams), whose field profiles are typically given by special functions that decay more slowly in the transverse direction (i.e. direction of propagation) than the Gaussian function. A laser assembly emits the pulsed laser beam 50 at a beam incidence side 58 of an optical assembly 62, the pulsed laser beam 50 being incident onto the optical assembly 62. The optical assembly 62 turns the incident laser beam into the laser beam focal line 54 on the output side over a defined expansion range along the beam direction (a length L of the focal line). The substrate sheet 14 to be processed is positioned in the beam path after the optical assembly 62 and overlapping at least partially the laser beam focal line 54 of laser beam 50.

The average diameter of the as manufactured damage channels 38 may be in the range from about 0.1 µm to about 50 µm, or in the range from about 1 µm to about 20 µm, or in the range from about 2 µm to about 10 µm, or in the range from about 0.1 µm to about 5 µm, or in a range of between about 0.1 µm to about 0.5 µm in diameter, or in a range between about 0.1 µm to about 2.0 µm, or in the range of about 0.2 µm to about 5 µm, or about 0.25 µm to about 5 µm, or about 0.3 µm to about 5 µm, or about 0.5 µm to about 5 µm. The disrupted or modified area (e.g., compacted, melted, or otherwise changed) of the material surrounding the damage channels 38 in the examples disclosed herein, may have diameter of less than about 50 microns, and, more specifically, less than about 10 microns, for example about 0.2 µm to about 6 µm, or about 0.3 µm to about 5 µm. The damage channels 38 may have an aspect ratio in the range of about 20:1 to about 50,000:1, or may be in the range of about 10:1 to about 12,000:1, or may be in the range of about 50:1 to about 500:1. In yet other examples, the aspect ratio may be as high as 150,000:1. The aspect ratio is measured as the length of the damage channels 38 (e.g., the thickness of the substrate sheet 14) to the diameter of the damage channels 38.

The density of damage channels 38 may vary or be consistent over the first and/or second damage regions 18, 26. For example, the damage channels 38 may have a higher density in the first damage region 18 relative to the second damage region 26 or in the interrupted zones 34 relative to the first and/or second damage regions 18, 26. Such a feature may be advantageous in allowing preferential etching, as explained later, to take place in specific areas of the substrate sheet 14.

The individual damage channels 38 can be created at rates of several hundred kilohertz (several hundred thousand per second, for example). Thus, with relative motion between the laser source and the substrate sheet 14, the damage channels 38 can be placed adjacent to one another and in whatever pattern desired. For example, the damage channels 38 may have a high concentration within the first and/or second damage regions 18, 26, but may be nearly or completely absent from the interrupted zones 34. The spatial separation and the size of the damage channels 38 may be at least partly selected based on a permeability of the article 10.

The substrate sheet 14 is preferably aligned substantially perpendicularly to a longitudinal beam axis and thus behind the same focal line 54 produced by the optical assembly 62 (the substrate is perpendicular to the drawing plane) and viewed along the beam direction it is positioned relative to the focal line 54 in such a way that the focal line 54 viewed in beam direction starts before the first surface 14A of the substrate sheet 14 and stops after the second surface 14B of the substrate sheet 14 (i.e. extending through the substrate sheet 14). In the overlapping area of the laser beam focal line 54 with substrate sheet 14 (i.e. in the substrate sheet 14 covered by focal line 54) the laser beam focal line 54 thus generates (in case of a suitable laser intensity along the laser beam focal line 54) a section 66 aligned with the longitudinal beam direction, along which an induced nonlinear absorption is generated in the substrate sheet 14. The induced nonlinear absorption induces damage channel formation in the article along section 66. The defect line formation is not only local, but extends over the entire length of section 66 of the induced absorption. It should be noted that although depicted as extending through the substrate sheet 14, the focal line 54 may extend only partially into the substrate sheet 14, thereby forming a damage channel which does not extend between the first and second surfaces 14A, 14B. Such a feature may be advantageous in forming the different examples of the interrupted zones 34 explained above. The average diameter or extent of the section of the induced absorption (or the sections in the material of substrate sheet 14 undergoing the damage channel formation) is labeled with reference D. The average extension D generally corresponds to the average diameter of the laser beam focal line 54, that is, an average spot diameter.

According to some examples, creating an angle between an orthogonal axis of the first and second surfaces 14A, 14B of the substrate sheet 14 and the pulsed laser beam 50 alters the angle at which the laser beam focal line 54 will be formed in the substrate sheet 14. By altering the angle at which the beam focal line 54 contacts the substrate sheet 14, the damage channel may also be formed at an angle through the substrate sheet 14. The laser beam focal line 54 may be incident on the substrate sheet 14 at an angle in the range of about 0° to about 40°, or in a range of about 0.5° to about 15°, or in a range of about 1° to about 10°.

In an alternative example, the damage channels 38 may be formed in the substrate sheet 14 via laser percussion drilling. Percussion drilling is performed using a laser having a suitable wavelength and intensity, the laser spot size determining the final damage channel size. Wavelengths that may be used range between about 100 nanometers to about 1070 nanometers, or in a range of about 150 nanometers to about 400 nanometers. According to some examples, the laser may utilize an ultraviolet laser beam having a wavelength of about 355 nanometers. In yet other examples, the laser may operate at a higher wavelength such as about 100 nm or greater, about 2000 nm or greater or about 3000 nm or greater. During percussion drilling, the laser is focused to a Gaussian spot on a surface (e.g., the first or second surface 14A, 14B) of the substrate sheet 14, the Gaussian spot having a diameter in the range of about 1 µm to about 20 or in a range of about 3 µm to about 10 The laser is pulsed to repetitively strike the same location on the substrate sheet 14. The laser pulse duration is between 1 ns and 100 ns, or more specifically between 10 ns and 25 ns. In a specific example, the pulsing of the laser beam may have a pulse width of about 100 ps or less. The laser may be capable of between about 50,000 pulses per second to about 150,000 pulses per second. In a specific example, the laser pulse duration may be about 100,000 pulses per second. With each pulse, a portion of material is removed from the substrate sheet 14 and the damage channel begins to form. As the damage channel is formed in the substrate sheet 14, the damage channel confines the laser beam and creates a long thin hole through the substrate sheet 14. The laser is pulsed until the damage channel is of a desired depth within the substrate sheet 14 and the laser is shut off. The laser beam and/or substrate sheet 14 are then moved relative to one another and the process repeated to form the next damage channel. It will be understood that during movement of the laser and/or substrate sheet 14, the first array of first damage regions 18 and the second array of second damage regions 26 may be formed in separate passes or may be formed substantially simultaneously. For purposes of this disclosure, the term "substantially simultaneously" may mean that the first and second damage regions 18, 26 are formed in the same pass of the laser or translation of the substrate sheet 14 such that the laser and/or substrate sheet 14 does not need to be reset to a starting position to commence formation of the other damage region.

Percussion drilling may allow the damage channels 38 to be tapered. For example, in an example where the percussion drilling laser is incident on the first surface 14A of the substrate sheet 14, the damage channel 38 may have an opening at the first surface 14A of about 15 µm to about 25 µm in diameter, and an opening on the second surface 14B of the substrate sheet 14 having a diameter of about 5 µm to about 10 µm.

Figure 5:
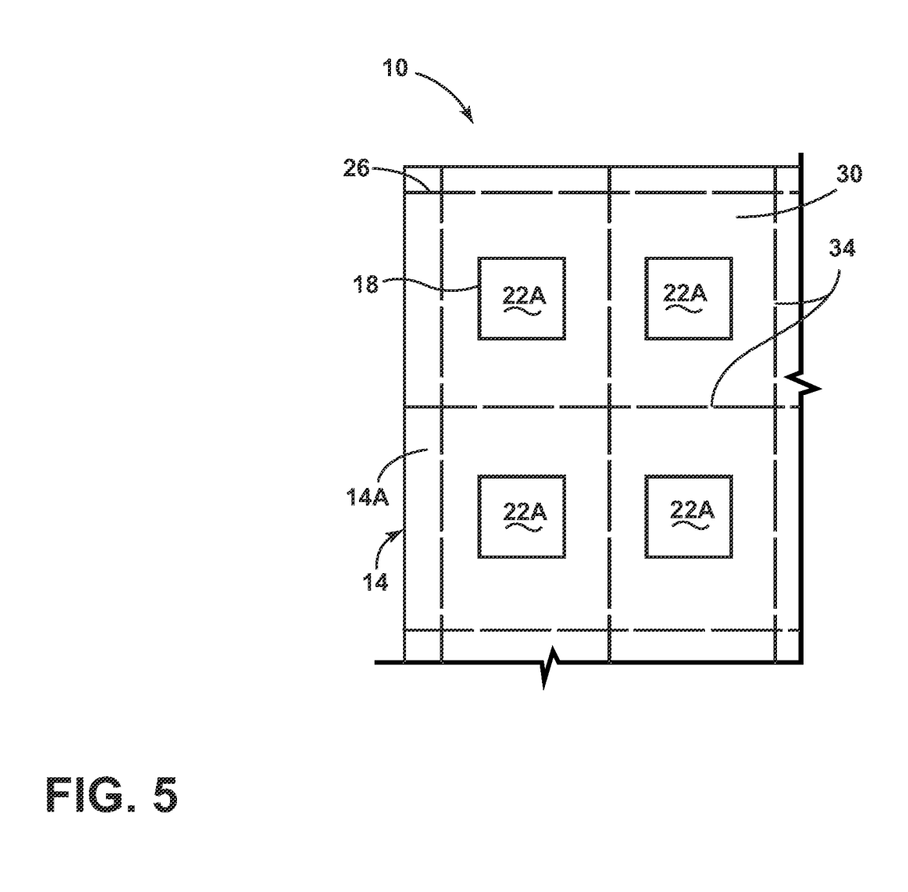
FIG. 5 in enhanced view of the article of FIG. 1 after an etching step is performed on the article, according to at least one example.

Referring now to FIG. 5, an etchant solution may be applied to the substrate sheet 14 after the laser was utilized to form the damage channels 38 in the substrate sheet 14 and thus has formed the first and/or second damage regions 18, 26. Use of the etchant solution may preferentially dissolve or remove material from the first and/or second damage regions 18, 26 relative to the rest of the substrate sheet 14. Application of the etchant solution to the substrate sheet 14 may widen the damage channels 38 of the first and/or second damage regions 18, 26 such that the damage channels 38 converge to form a continuous break in the substrate sheet 14. The first and second damage regions 18, 26 (e.g., now slots) may be widened from the width of the damage channels 38 to a thickness or width of about 10 µm or greater, about 20 µm or greater, about 30 µm or greater, about 40 µm or greater, about 50 µm or greater, about 75 µm or greater, or about 100 µm or greater.

In practice, etching of the substrate sheet 14 incorporating the first and/or second damage regions 18, 26 may result in the removal or separating of the first and/or second portions 22, 30 from the substrate sheet 14. For instance, in an example of the substrate sheet 14 where the first damage regions 18 do not incorporate the interrupted zones 34 and the second damage regions 26 do incorporate the interrupted zones 34, etching of the substrate sheet 14 may remove all connection of the first portions 22 from the substrate sheet 14 such that the first portions 22 (FIG. 2A) are disconnected, or removed, from the substrate sheet 14 while the second portions 30 remain (i.e., connected via the interrupted zones 34). In such an example, a hole 22A may be defined by the second portions 30 in approximately the same size and shape as the first portion 22 which occupied it. As such, the first array of first damage regions 18 may form a first array, or a plurality, of holes 22A across and through the substrate sheet 14. As will be explained in greater detail below, the interrupted zones 34 connecting the second portions 30 to the remainder of the substrate sheet 14 may be of such a thickness and shape that the second portions 30 may be singulated, or diced, from the sheet 14 with minimal force and without damage occurring to the remainder of the sheet 14. Further, application of the etchant solution may heal any micro-cracks or areas of mechanical weakness in the substrate sheet 14 that formed during laser formation of damage channels in the substrate sheet 14, for example by using percussion laser drilling, a laser process that utilizes laser line focus, or any other suitable laser processing method that forms the damage channels 38.

The etchant solution may include hydrofluoric acid, nitric acid, hydrochloric acid, potassium hydroxide, sodium hydroxide, and/or combinations thereof. In an exemplary embodiment, the etchant may include about 5% hydrofluoric acid and about 10% nitric acid. The process is typically carried out by submersing the substrate sheet 14 in a liquid solution of the etchant solution, but it will be understood that the etchant solution may be applied by spray or other forms of deposition without departing from the teachings provided herein. By controlling the concentration of the acid, the temperature of the solution and the exposure time, the total amount of material removed from the substrate sheet 14 can be adjusted. Additionally, the etching can be performed while agitating the substrate sheet 14, or in the presence of ultrasound, to increase the fluid exchange inside the damage regions to lower the total amount of etching time.

The size, shape and volume of the interrupted zones 34 holding the second portions 30 parts to the substrate sheet 14 may be may be tailored based on the mechanical properties of the material of the substrate sheet 14. The volume of the interrupted zones 34 should be enough to retain the benefits of having an undamaged sheet 14, with attributes like the mechanical robustness; however, the volume of the interrupted zones 34 should be minimized in order to facilitate fast singulation of the second portions 30. The individual second portions 30 may be of any desired shape, and the shapes of the individual portions 30 may be the same or different from one another. The individual second portions 30 may have internal holes, slots or cut outs, created by the laser and/or etching process described herein.

The second portions 30, now being retained to the substrate sheet 14 via the interrupted zones 34, may be singulated, or diced by a variety of methods. In such singulation methods, the interrupted zones 34 are severed, or broke, to free the second portions 30. The second portions 30 may be removed one at a time or a plurality of the second portions 30 may be removed one at a time. For example, the second portions 30 may be retained by the interrupted zones 34 with such little force strength that the second portions 30 may be singulated from the sheet 14 via a mechanical method such as hand breaking (e.g., snapping) or with a mechanical tool (e.g., a diamond scribe). In other examples, a torch, laser or other method of breaking the interrupted zones 34 may be utilized to detach individual second portions 30.

Figure 6:
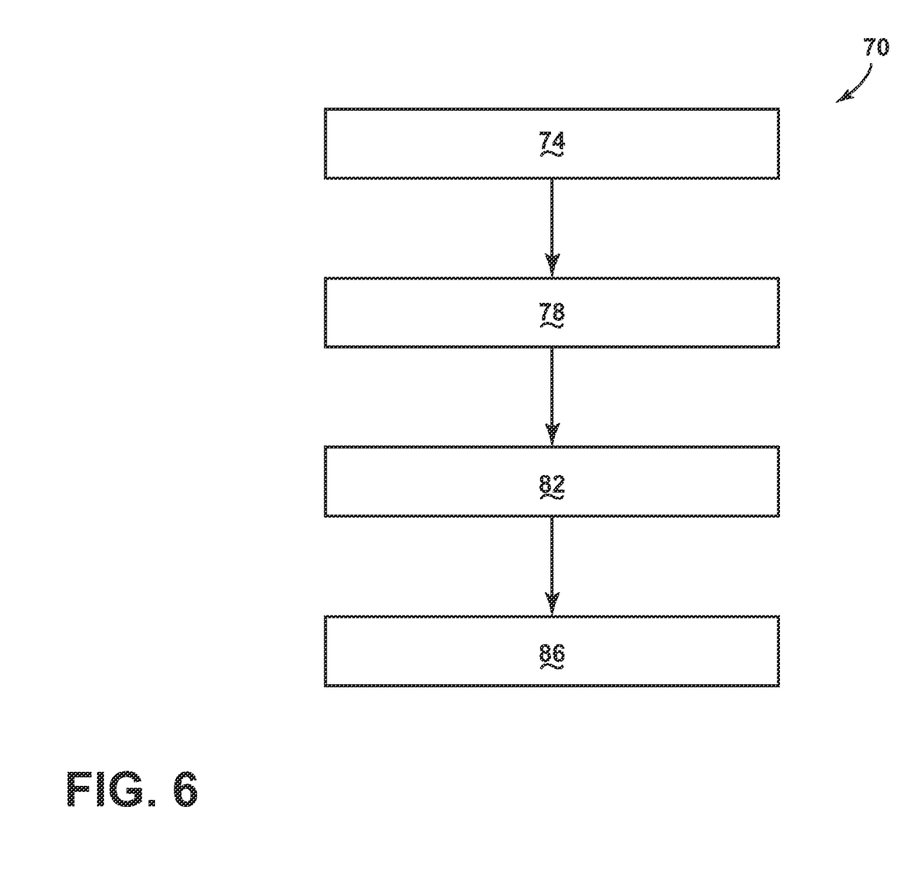
FIG. 6 is a flow diagram of a method according to at least one example.

Referring now to FIG. 6, an exemplary method 70 of forming the article 10 is depicted. The method 70 may begin with a step 74 of providing the substrate sheet 14. As explained above, the substrate sheet 14 may be formed of a glass, a glass-based material, a glass-ceramic, a ceramic, a polymer material and/or combinations thereof.

Next a step 78 of forming the first array of first damage regions 18 is performed. As explained above, the first damage region 18 may be formed in a repeating or a non-repeating array of damage channels 38 produced by pulsing a laser. The pulsed laser and/or the substrate sheet 14 may be moved or translated relative to one another to form the first damage region 18.

Next, a step 82 of forming the second array of second damage regions 26 which define the plurality of second portions 30 is performed. The second array of second damage regions 26 may define one or more of the interrupted zones 34 which may have a length, or largest dimension, of about 10 microns or greater. Step 82 may be performed such that the first and second damage regions 18, 26 at least partially overlap and the arrays of the first and second damage regions 18, 26 may be formed by pulsing a laser. As explained above, the steps of forming the first array of first damage regions 18 and forming the second array of second damage regions 26 may be performed substantially simultaneously. Further, the first and/or second damage regions 18, 26 may be formed by translating the pulsed laser beam on the substrate sheet 14. As explained above, the second damage region 26 may include, or define, the interrupted zones 34. In some examples, formation of the array of the second damage regions 26 may be performed such that the interrupted zones 34 are free of damage channels 38 (e.g., FIG. 3A). In other examples, formation of the array of the second damage regions 26 may be performed such that the interrupted zones 34 include damage channels 38 (e.g., FIG. 3B).

Finally, a step 86 of singulating the plurality of second portions 30 from the glass substrate sheet 14 may be performed. As explained above, singulation of the second portions 30 may be accomplished via mechanical force (i.e., by hand and/or with a machine), via a torch, a laser or other method of freeing the second portions 30 from the substrate sheet 14.

Use of the present disclosure may offer a variety of advantages. First, use of the disclosed method and systems of forming the article 10 may allow for faster throughput and manufacturing of the articles 10. For example, by creating the plurality of second portions 30 in parallel which may later be singulated, as opposed to traditional serial manufacturing techniques, a greater number of second portions 30 may be formed per manufacturing process. In other words, a plurality of second portions 30 may be formed from a single "mother" sheet (i.e., the article substrate sheet 14) and be singulated as needed. Second, use of the interruption zones 34 may allow for a more robust final article 10. As the interruption zones 34 allow for an unbroken connection between the second portions 30 and the substrate sheet 14, the final article 10 may have a greater robustness as compared to traditional designs. As explained above, the final dimensions of the interrupted zones, and therefore the force used to singulate the second portions 30, may be tailored which may allow for an increased yield of second portions 30.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

What is claimed is:

1. A method of forming a glass article, comprising:
   providing a glass substrate sheet;
   forming a first array of first damage regions;
   forming a second array of second damage regions which define a plurality of portions, wherein the second array of second damage regions define one or more interrupted zones comprising a largest dimension of about 10 microns or greater;
   etching the glass substrate; and
   singulating the plurality of portions from the glass substrate sheet.

2. The method of claim 1, wherein the step of forming the second array of second damage regions is performed such that the first and second damage regions at least partially overlap.

3. The method of claim 1, wherein the step of singulating the plurality of second portions further comprises the step of:
   mechanically singulating the plurality of second portions from the glass substrate sheet.

4. The method of claim 1, further comprising the step of forming the first array of first damage regions further comprises the step of:
   forming the first array of first damage regions using at least one of a Bessel or a distributed focus laser beam.

5. The method of claim 1, further comprising the step of:
   pulsing a laser beam to form at least one of the first and second arrays.

6. The method of claim 5, wherein the pulsing of the laser beam comprises a pulse width of about 100 ps or less.

7. A method of forming a glass article, comprising:
   providing a glass substrate sheet;
   forming a first array of first damage regions to form a plurality of first portions;
   forming a second array of second damage regions to form a plurality of second portions, wherein the second array of damage regions define one or more interrupted zones;
   etching the glass substrate sheet such that the first portions are disconnected from the glass substrate sheet; and
   singulating the plurality of second portions from the glass substrate sheet.

8. The method of claim 7, wherein the step of etching the glass substrate further comprises the step of:
   etching the glass substrate sheet with an etchant solution comprising at least one of hydrofluoric acid, nitric acid and hydrochloric acid.

9. The method of claim 7, wherein at least one of the steps of forming the first array of first damage regions and forming the second array of second damage regions further comprises the step of:
   translating a pulsed laser beam and a glass substrate sheet relative to one another.

10. The method of claim 7, wherein the steps of forming the first array of first damage regions and forming the second array of second damage regions is performed substantially simultaneously.

11. The method of claim 7, wherein the step of forming the second array of second damage regions further comprises the step of:
   forming the second array of second damage regions such that the interrupted zones are free of damage channels.

12. The method of claim 7, wherein the step of forming the second array of second damage regions further comprises the step of:
   forming the second array of second damage regions such that the interrupted zones comprise damage channels.

13. The method of claim 7, wherein the step of forming the second array of second damage regions further comprises the step of:
   forming the second array of second damage regions such that the interrupted zones comprise about 10% or less of a perimeter of the second array of second damage regions.

\* \* \* \* \*

UNITED STATES PATENT AND TRADEMARK OFFICE
CERTIFICATE OF CORRECTION

PATENT NO. : 10,626,040 B2
APPLICATION NO. : 16/007015
DATED : April 21, 2020
INVENTOR(S) : Kristopher Allen Wieland It is certified that error appears in the above-identified patent and that said Letters Patent is hereby corrected as shown below:

On the Title Page

On page 4, Column 2, item (56), other publications, Line 6, delete "micro-achitecture," and insert -- micro-architecture, --, therefor.

On page 5, Column 1, item (56), other publications, Line 15, delete "Egineering" and insert -- Engineering --, therefor.

On page 5, Column 1, item (56), other publications, Line 56, delete "EuropeTec" and insert -- EuropTec --, therefor.

On page 5, Column 2, item (56), other publications, Line 3, delete "Proccessing" and insert -- Processing --, therefor.

On page 5, Column 2, item (56), other publications, Line 67, delete "modelocked" and insert -- mode-locked --, therefor.

On page 6, Column 2, item (56), other publications, Line 9, delete "pluse" and insert -- pulse --, therefor.

Signed and Sealed this
Fourth Day of October, 2022

*Katherine Kelly Vidal*

Katherine Kelly Vidal
*Director of the United States Patent and Trademark Office*